US011221052B2

United States Patent
Inoue et al.

(10) Patent No.: US 11,221,052 B2
(45) Date of Patent: Jan. 11, 2022

(54) MOUNT BUSH

(71) Applicants: HONDA MOTOR CO., LTD., Tokyo (JP); NATIONAL UNIVERSITY CORPORATION KANAZAWA UNIVERSITY, Kanazawa (JP)

(72) Inventors: Toshio Inoue, Wako (JP); Toshihiko Komatsuzaki, Kanazawa (JP)

(73) Assignees: HONDA MOTOR CO., LTD., Tokyo (JP); NATIONAL UNIVERSITY CORP KANAZAWA UNIVERSITY, Kanazawa (JP)

( * ) Notice: Subject to any disclaimer, the term of this patent is extended or adjusted under 35 U.S.C. 154(b) by 109 days.

(21) Appl. No.: 16/583,428

(22) Filed: Sep. 26, 2019

(65) Prior Publication Data
US 2020/0109762 A1    Apr. 9, 2020

(30) Foreign Application Priority Data

Oct. 5, 2018    (JP) .............................. JP2018-190231

(51) Int. Cl.
*F16F 13/30*    (2006.01)
*H01F 1/44*    (2006.01)
(Continued)

(52) U.S. Cl.
CPC .......... *F16F 13/305* (2013.01); *B60K 5/1208* (2013.01); *B60K 5/1283* (2013.01);
(Continued)

(58) Field of Classification Search
CPC .......... F16F 13/305; F16F 13/14; F16F 13/28; F16F 2228/066; B60K 5/1208; B60K 5/1283; H01F 1/447; H01F 7/02
(Continued)

(56) References Cited

U.S. PATENT DOCUMENTS 5,492,312 A    2/1996  Carlson
5,632,361 A *  5/1997  Wulff .................... F16F 9/3405
                                                188/267
(Continued)

FOREIGN PATENT DOCUMENTS

CN    102182785    9/2011
CN    104179877    12/2014
(Continued)

OTHER PUBLICATIONS

Japanese Notice of Allowance for Japanese Patent Application No. 2018-190231 dated Sep. 23, 2020.
(Continued)

*Primary Examiner* — Thomas W Irvin
(74) *Attorney, Agent, or Firm* — Amin, Turocy & Watson, LLP

(57) ABSTRACT

A mount bush includes a tubular member, a shaft member disposed inside the tubular member coaxially with an axis of the tubular member and including a coil, a permanent magnet provided on at least one of the tubular member and the shaft member, a magnetic viscoelastic fluid filled in an internal space, a first liquid chamber disposed in the internal space at a first side, a second liquid chamber communicating with the first liquid chamber, and a third liquid chamber communicating with the second liquid chamber, wherein the coil is disposed such that a magnetic path passing through the second liquid chamber in an orientation along at least one of the axial direction and the radial direction perpendicular to the axial direction is formed through electrical conduction, and the permanent magnet is disposed such that a magnetizing direction is formed along the magnetic path.

5 Claims, 8 Drawing Sheets

(51) Int. Cl.
  *B60K 5/12* (2006.01)
  *F16F 13/28* (2006.01)
  *F16F 13/14* (2006.01)
  *H01F 7/02* (2006.01)

(52) U.S. Cl.
  CPC .............. *F16F 13/14* (2013.01); *F16F 13/28* (2013.01); *H01F 1/447* (2013.01); *F16F 2228/066* (2013.01); *H01F 7/02* (2013.01)

(58) Field of Classification Search
  USPC ............ 267/140.16, 140.15; 188/267, 267.1, 188/267.2
  See application file for complete search history.

(56) References Cited

U.S. PATENT DOCUMENTS

| | | | | |
|---|---|---|---|---|
| 6,427,813 | B1* | 8/2002 | Carlson | F16F 9/535 |
| | | | | 188/267.2 |
| 8,651,250 | B2* | 2/2014 | Nehl | F16F 9/535 |
| | | | | 188/267 |
| 9,390,875 | B2* | 7/2016 | Kohlhafer | H01H 50/04 |
| 10,823,251 | B2* | 11/2020 | McCullough | F16F 9/19 |
| 2002/0036372 | A1* | 3/2002 | Goto | F16F 13/268 |
| | | | | 267/140.14 |
| 2010/0089711 | A1* | 4/2010 | Nehl | F16F 9/535 |
| | | | | 188/267.2 |
| 2014/0354381 | A1* | 12/2014 | Kohlhafer | H01F 7/081 |
| | | | | 335/179 |
| 2018/0363724 | A1* | 12/2018 | McCullough | F16F 9/3292 |
| 2020/0109761 | A1* | 4/2020 | Inoue | H01F 1/447 |

FOREIGN PATENT DOCUMENTS

| | | |
|---|---|---|
| CN | 108302149 | 7/2018 |
| JP | 63-210432 | 9/1988 |
| JP | 2003-035345 | 2/2003 |
| JP | 2003-065384 | 3/2003 |
| JP | 2010-242945 | 10/2010 |
| JP | 2012-157574 | 8/2012 |
| JP | 2015-183846 | 10/2015 |
| WO | 2019/026566 | 2/2019 |

OTHER PUBLICATIONS

Chinese Office Action for Chinese Patent Application No. 201910896731.1 dated Dec. 9, 2020.

* cited by examiner

MOUNT BUSH

CROSS-REFERENCE TO RELATED APPLICATION

Priority is claimed on Japanese Patent Application No. 2018-190231, filed Oct. 5, 2018, the content of which is incorporated herein by reference.

BACKGROUND OF THE INVENTION

Field of the Invention

The present invention relates to a mount bush.

Description of Related Art

In the related art, a damping apparatus (a mount bush) using a magnetic viscoelastic fluid is known as a damper of an engine mount or a suspension of an automobile.

For example, Japanese Unexamined Patent Application, First Publication No. 2003-35345 discloses an automatic tensioner including a cylinder body connected to an engine, a piston fitted into the cylinder body and connected to an arm, a communication path configured to divide two chambers filled with a magnetic viscoelastic fluid by the piston in the cylinder body and allow the two chambers to communicate with each other, and an electromagnet configured to generate a magnetic force on an outer side of the cylinder body. According to the technology disclosed in Japanese Unexamined Patent Application, First Publication No. 2003-35345, when a magnetic force on the magnetic viscoelastic fluid is controlled by being changed, a damping constant with respect to a moving body can be varied, and a damping means of the automatic tensioner can be made active.

SUMMARY OF THE INVENTION

However, in the technology disclosed in Japanese Unexamined Patent Application, First Publication No. 2003-35345, when supply of current to an electromagnet (a coil) is unintentionally stopped, a viscosity of the magnetic viscoelastic fluid is in the most degraded state, desired damping characteristics and rigidity in the mount bush cannot be obtained, and steering stability of a vehicle may be greatly changed.

Accordingly, in the technology disclosed in Japanese Unexamined Patent Application, First Publication No. 2003-35345, there is a problem in providing a mount bush capable of obtaining desired damping characteristics and rigidity regardless of an electrical conduction state and a non-conduction state.

An aspect of the present invention is directed to providing a mount bush capable of obtaining desired damping characteristics and rigidity regardless of an electrical conduction state and a non-conduction state.

(1) A mount bush according to the present invention includes a tubular member; a shaft member that is disposed inside the tubular member coaxially with an axis of the tubular member and that includes a coil; a permanent magnet provided on at least one of the tubular member and the shaft member; a magnetic viscoelastic fluid filled into an internal space between the tubular member and the shaft member; a first liquid chamber disposed in the internal space at a first side in the axial direction which extends along the axis; a second liquid chamber communicating with of the first liquid chamber at a second side in an axial direction; and a third liquid chamber communicating the second liquid chamber at the second side in the axial direction, wherein the coil is disposed such that a magnetic path, which passes through the second liquid chamber in an orientation along at least one of the axial direction and a radial direction perpendicular to the axial direction, is formed through electrical conduction, and the permanent magnet is disposed such that a magnetizing direction is formed along the magnetic path.

(2) In the aspect of the above-mentioned (1), the second liquid chamber may include an axial passage that communicates with the first liquid chamber and that extends in the axial direction; and a shaft-perpendicular passage that communicates with the axial passage and the third liquid chamber and that extends in the radial direction, wherein the coil may be disposed such that the magnetic path, which passes through the axial passage in an orientation along the radial direction and passes through the shaft-perpendicular passage in an orientation along the axial direction, is formed through the electrical conduction.

(3) In the aspect of the above-mentioned (2), at least one of a wall surface of the tubular member and a wall surface of the shaft member may have a concave section which is formed at a portion in which the magnetic path is formed.

(4) In the aspect of any one of the above-mentioned (1) to (3), the tubular member may include a first magnetic member, the shaft member may include a second magnetic member, and the magnetic path formed by the coil may pass through the first magnetic member and the second magnetic member.

(5) In the aspect of any one of the above-mentioned (1) to (4), the permanent magnet may be formed in a tubular shape coaxial with the axis.

(6) In the aspect of any one of the above-mentioned (1) to (5), at least one of the first liquid chamber and the third liquid chamber may be divided in a circumferential direction by an elastic member.

(7) In the aspect of any one of the above-mentioned (1) to (6), the permanent magnet may be provided on the shaft member and the magnetizing direction may be directed in the axial direction.

(8) In the aspect of any one of the above-mentioned (1) to (6), the permanent magnet may be provided on the shaft member and the magnetizing direction may be directed in the radial direction.

(9) In the aspect of any one of the above-mentioned (1) to (6), the permanent magnet may be provided on the tubular member and the magnetizing direction may be directed in the radial direction.

According to the aspect of the above-mentioned (1), since the magnetic viscoelastic fluid passes through the second liquid chamber and moves between the first liquid chamber and the third liquid chamber, damping characteristics of the mount bush can be controlled by varying the viscosity of the magnetic viscoelastic fluid in the second liquid chamber. Here, the permanent magnet forms the magnetic path passing through the second liquid chamber in the orientation along at least one of the axial direction and the radial direction. For this reason, in the magnetic viscoelastic fluid filled into the second liquid chamber, movement of the magnetic powder is restricted by the magnetic force of the permanent magnet, and the high viscosity is maintained. Accordingly, even in the non-conduction state in which current does not flow through the coil, desired damping characteristics and rigidity can be secured in the mount bush. In addition, the viscosity of the magnetic viscoelastic fluid can be decreased in comparison with in the non-conduction state through electrical conduction to the coil so that the magnetic force occurs in an orientation against the magnetizing direction of the permanent magnet.

On the contrary, the viscosity of the magnetic viscoelastic fluid can be increased in comparison with in the non-conduction state through electrical conduction to the coil so that a magnetic force occurs in an orientation along the magnetizing direction of the permanent magnet. Accordingly, a degree of freedom when damping characteristics are varied can be improved.

In addition, since the magnetic viscoelastic fluid of the second liquid chamber is maintained by the magnetic force of the permanent magnet in the state in which the density of the magnetic powder is high, for example, when the magnetic viscoelastic fluid is applied to a part having a small stroke like the mount bush or the like of the engine and in which it is difficult for the magnetic viscoelastic fluid to be stirred, precipitation of the magnetic powder can be suppressed. Accordingly, responsiveness according to a variation in viscosity upon electrical conduction to the coil can be improved.

Accordingly, it is possible to provide a mount bush capable of suppressing precipitation of the magnetic powder and obtaining desired damping characteristics and rigidity regardless of an electrical conduction state and a non-conduction state.

According to the aspect of the above-mentioned (2), since the permanent magnet forms the magnetic path in an orientation passing through the axial passage in the radial direction and an orientation passing through the shaft-perpendicular passage in the axial direction, in the magnetic viscoelastic fluid filled into the axial passage and the shaft-perpendicular passage, movement of the magnetic powder is restricted by the magnetic force of the permanent magnet, and a high viscosity is maintained. Accordingly, even in the non-conduction state in which current does not flow through the coil, desired damping characteristics and rigidity can be secured in the mount bush. In addition, since the second liquid chamber has the axial passage and the shaft-perpendicular passage, a fluid resistance easily occurs in the magnetic viscoelastic fluid according to a variation in flow direction in the magnetic viscoelastic fluid. Accordingly, a high viscosity of the magnetic viscoelastic fluid in the non-conduction state can be maintained.

Accordingly, it is possible to provide the mount bush capable of obtaining desired damping characteristics and rigidity regardless of an electrical conduction state and a non-conduction state.

According to the aspect of the above-mentioned (3), since at least one of a wall surface of the tubular member and a wall surface of the shaft member has the concave section formed at the portion in which the magnetic path is formed, precipitation of the magnetic powder is suppressed by accumulating the magnetic powder on the concave section. Accordingly, the state in which the density of the magnetic powder of the magnetic viscoelastic fluid in the vicinity of the second liquid chamber is high can be maintained. Accordingly, responsiveness according to a variation in viscosity upon electrical conduction to the coil can be improved.

Accordingly, it is possible to provide the mount bush in which precipitation of the magnetic powder is suppressed.

According to the above-mentioned (4), the magnetic path passing through the second liquid chamber is formed by the first magnetic member and the second magnetic member. Accordingly, desired damping characteristics and rigidity can be secured in the mount bush even in the non-conduction state.

Accordingly, it is possible to provide the mount bush capable of obtaining desired damping characteristics and rigidity regardless of an electrical conduction state and a non-conduction state.

According to the aspect of the above-mentioned (5), since the permanent magnet is formed in a tubular shape, the magnetic path of the permanent magnet is formed throughout the circumferential direction. Accordingly, a rate of change of the viscosity of the magnetic viscoelastic fluid in the circumferential direction can be uniformized in the circumferential direction.

According to the aspect of the above-mentioned (6), at least one of the first liquid chamber and the third liquid chamber is divided in the circumferential direction by the elastic member. Accordingly, a flow of the magnetic viscoelastic fluid in the circumferential direction can be suppressed, and the magnetic viscoelastic fluid can reliably flow into the second liquid chamber in which the magnetic path is formed. Accordingly, the viscosity of the magnetic viscoelastic fluid can be reliably controlled.

According to the aspect of the above-mentioned (7), since the permanent magnet is provided on the shaft member and the magnetizing direction is directed in the axial direction, the magnetic path of the permanent magnet can be formed along the magnetic path formed by the coil. Accordingly, the viscosity of the magnetic viscoelastic fluid can be increased or decreased according to electrical conduction to the coil. In addition, precipitation of the magnetic powder can be suppressed by maintaining the state in which the density of the magnetic powder in the second liquid chamber is high.

Accordingly, it is possible to provide the mount bush capable of suppressing precipitation of the magnetic powder and obtaining desired damping characteristics and rigidity regardless of an electrical conduction state and a non-conduction state.

According to the aspect of the above-mentioned (8), since the permanent magnet is provided on the shaft member and the magnetizing direction is directed in the radial direction, the magnetic path of the permanent magnet can be formed along the magnetic path formed by the coil. Accordingly, the viscosity of the magnetic viscoelastic fluid can be increased or decreased according to electrical conduction to the coil. In addition, precipitation of the magnetic powder can be suppressed by maintaining the state in which the density of the magnetic powder in the second liquid chamber is high.

Accordingly, it is possible to provide the mount bush capable of suppressing precipitation of the magnetic powder and obtaining desired damping characteristics and rigidity regardless of an electrical conduction state and a non-conduction state.

According to the aspect of the above-mentioned (9), since the permanent magnet is provided on the tubular member and the magnetizing direction is directed in the radial direction, the magnetic path of the permanent magnet can be formed along the magnetic path formed by the coil. Accordingly, the viscosity of the magnetic viscoelastic fluid can be increased or decreased according to electrical conduction to the coil. In addition, precipitation of the magnetic powder can be suppressed by maintaining the state in which the density of the magnetic powder in the second liquid chamber is high.

Accordingly, it is possible to provide the mount bush capable of suppressing precipitation of the magnetic powder and obtaining desired damping characteristics and rigidity regardless of an electrical conduction state and a non-conduction state.

DETAILED DESCRIPTION OF THE INVENTION

Hereinafter, embodiments of the present invention will be described with reference to the accompanying drawings.
(First Embodiment)
(Mount Bush)

Figure 1:
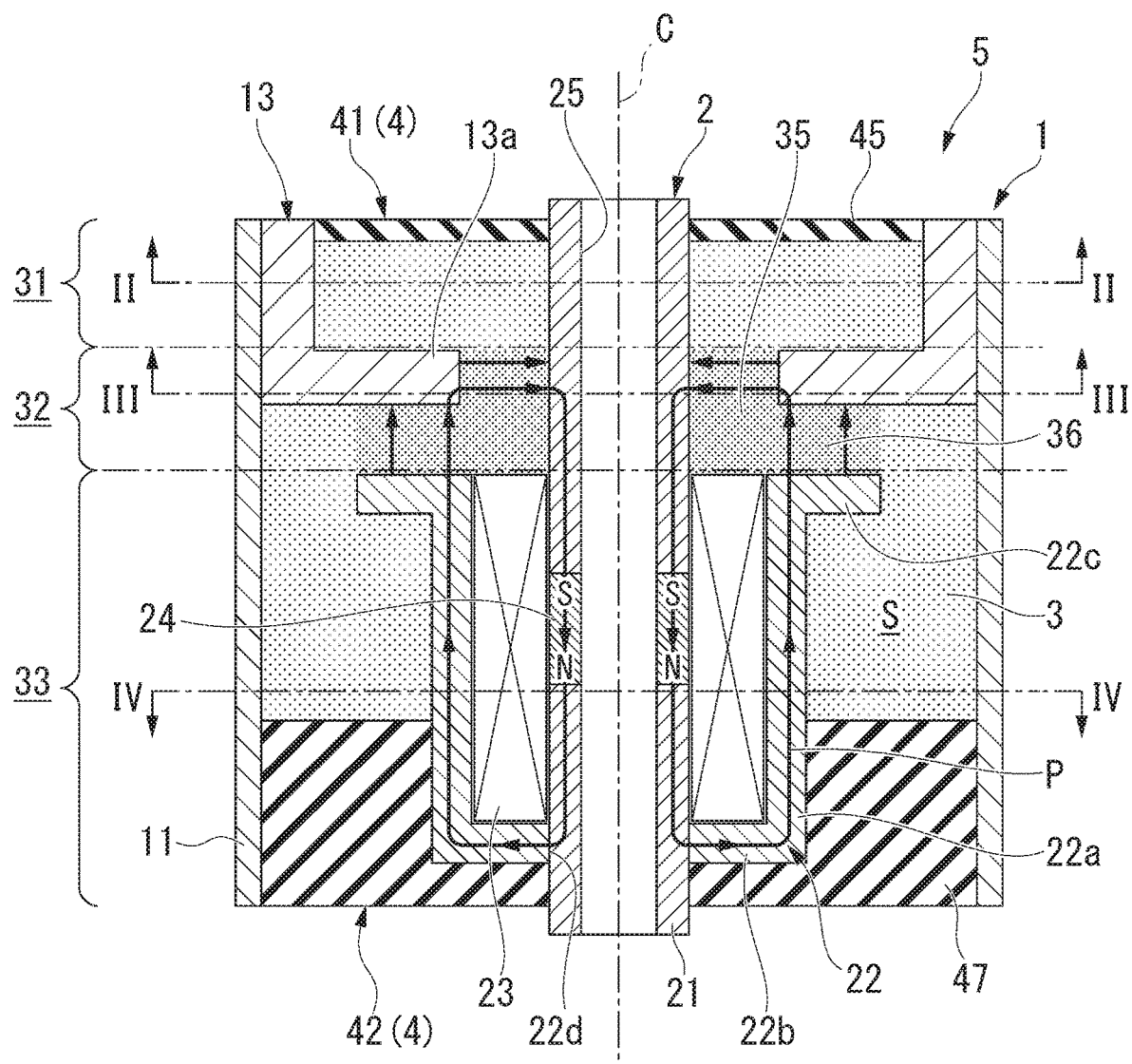
FIG. 1 is a longitudinal cross-sectional view of a mount bush according to a first embodiment.
Figure 2:
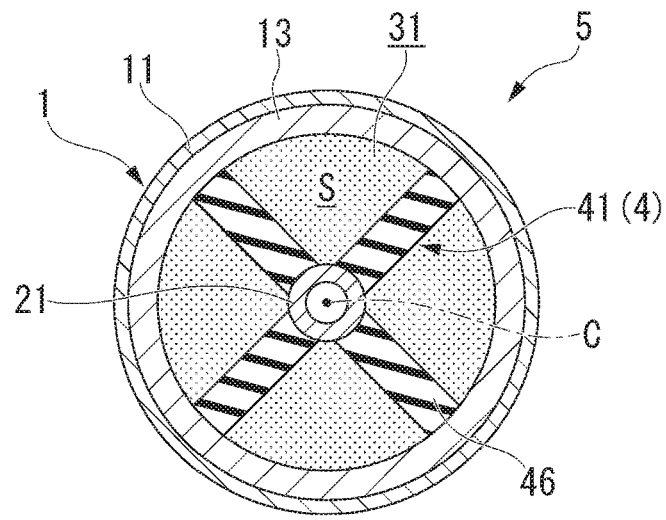
FIG. 2 is a cross-sectional view taken along line II-II in FIG. 1.
Figure 3:
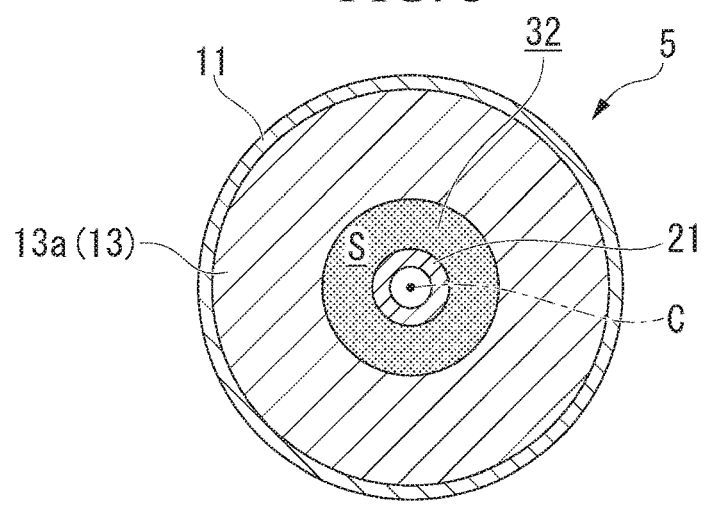
FIG. 3 is a cross-sectional view taken along line III-III in FIG. 1.
Figure 4:
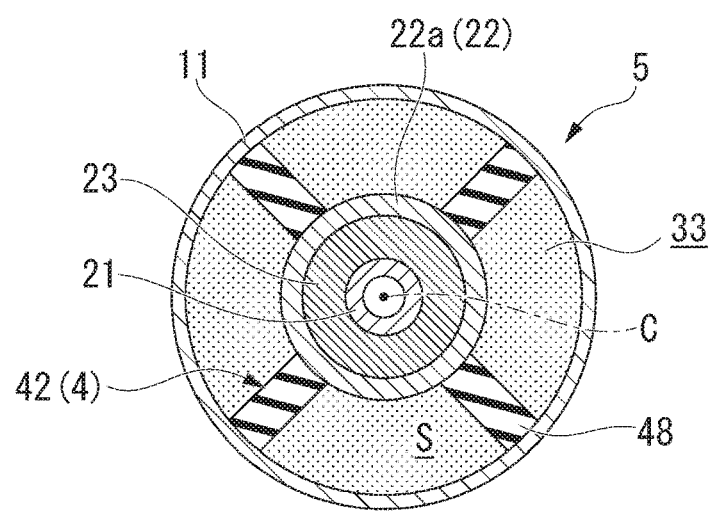
FIG. 4 is a cross-sectional view taken along line IV-IV in FIG. 1.

FIG. 1 is a longitudinal cross-sectional view of a mount bush 5 according to a first embodiment. FIGS. 2 to 4 are cross-sectional views taken along lines II-II, and IV-IV in FIG. 1.

For example, the mount bush 5 is provided between an engine (not shown) that is a power source of a vehicle and a vehicle body frame. The mount bush 5 is used as a damping apparatus configured to attenuate vibrations transmitted from the engine to the vehicle body frame.

The mount bush 5 includes a tubular member 1, a shaft member 2, a magnetic viscoelastic fluid 3 and an elastic member 4.
(Tubular Member)

As shown in FIG. 1, the tubular member 1 is formed in a tubular shape about an axis C. The tubular member 1 includes an outer tube 11 formed in a tubular shape about the axis C, and a first magnetic member 13. In the following description, a direction along the axis C may be referred as an axial direction, a direction perpendicular to the axis C may be referred as a radial direction, and a direction around the axis C may be referred as a circumferential direction.

The first magnetic member 13 is provided inside the outer tube 11 and on one side (on a side above in FIG. 1) in the axial direction. The first magnetic member 13 is formed in a tubular shape, and has an outer circumferential surface that is fixed to an inner circumferential surface of the outer tube 11. A first protrusion 13a is formed on the other side (a side below in FIG. 1) in the first magnetic member 13 in the axial direction. The first protrusion 13a protrudes from the other end portion of the first magnetic member 13 in the axial direction toward an inner side in the radial direction.
(Shaft Member)

The shaft member 2 is disposed inside the tubular member 1. The shaft member 2 is disposed to be movable with respect to the tubular member 1 in the axial direction and the radial direction. The shaft member 2 includes a shaft main body 21, a second magnetic member 22, a coil 23 and a permanent magnet 24.

The shaft main body 21 is disposed coaxially with the axis C. The shaft main body 21 is formed in a tubular shape having a vacancy 25 therein. A screw groove is formed in the vacancy 25.

The second magnetic member 22 is formed in a hat shape by a tubular section 22a, a bottom section 22b formed on the other side of the tubular section 22a in the axial direction, and a second protrusion 22c formed on one side of the tubular section 22a in the axial direction. The second magnetic member 22 is fixed to the shaft main body 21 by press-fitting the shaft main body 21 into a bottom hole 22d formed in the bottom section 22b. The second protrusion 22c protrudes from one end portion of the tubular section 22a in the axial direction toward an outer side in the radial direction.

The coil 23 is disposed between the shaft main body 21 and the tubular section 22a in the radial direction. The coil 23 is formed by winding a copper wire having a predetermined wire diameter around the shaft main body 21 in the circumferential direction. The other end portion of the coil 23 in the axial direction comes in contact with the bottom section 22b, and one end portion in the axial direction is substantially flush with the second protrusion 22c. The coil 23 is electrically connected to an electric power supply unit (not shown). A magnetic path is formed in the mount bush 5 by supplying current from the electric power supply unit (not shown) to the coil 23.

The permanent magnet 24 is formed integrally with the shaft main body 21. The permanent magnet 24 is disposed at a position overlapping the coil 23 in the axial direction and inside the coil 23 in the radial direction. The permanent magnet 24 is formed in a tubular shape coaxial with the axis C. The permanent magnet 24 is magnetized such that one side in the axial direction becomes an S pole and the other side in the axial direction becomes an N pole. A magnet magnetic path P is formed in the mount bush 5 by the permanent magnet 24. The permanent magnet 24 is disposed such that a magnetizing direction is provided along a magnetic path formed due to electrical conduction to the coil 23. Specifically, the magnet magnetic path P is formed such that a magnetic flux passes through the shaft main body 21, the bottom section 22b, the tubular section 22a, the first protrusion 13a and the shaft main body 21 in sequence.
(Magnetic Viscoelastic Fluid)

The magnetic viscoelastic fluid 3 is a mixed fluid in which a magnetic powder (not shown) is mixed with a fluid. An internal space S between the tubular member 1 and the shaft member 2 is filled with the magnetic viscoelastic fluid 3. The internal space S filled with the magnetic viscoelastic fluid 3 is divided into a first liquid chamber 31, a second liquid chamber 32 and a third liquid chamber 33.

The first liquid chamber 31 is disposed on one side in the axial direction. In the embodiment, the first liquid chamber 31 indicates a region disposed on one side in the axial direction of an end surface of the first protrusion 13a on one side in the axial direction.

The second liquid chamber 32 communicates with the other side in the first liquid chamber 31 in the axial direction. In the embodiment, the second liquid chamber 32 indicates a region disposed on the other side in the axial direction of the end surface of the first protrusion 13a on one side in the axial direction and disposed on one side in the axial direction of an end surface of the second protrusion 22c on one side in the axial direction. The second liquid chamber 32 has an axial passage 35 and a shaft-perpendicular passage 36.

The axial passage 35 communicates with the first liquid chamber 31. As shown in FIG. 1 and FIG. 3, the axial passage 35 is disposed between the first protrusion 13*a* of the first magnetic member 13 and the shaft main body 21, and extends in the axial direction.

The shaft-perpendicular passage 36 communicates with the axial passage 35. The shaft-perpendicular passage 36 is disposed between the first protrusion 13*a* of the first magnetic member 13 and the second protrusion 22*c* of the second magnetic member 22, and extends in the radial direction. The shaft-perpendicular passage 36 communicates with the third liquid chamber 33.

The third liquid chamber 33 communicates with the other side in the second liquid chamber in the axial direction. In the embodiment, the third liquid chamber 33 indicates a region disposed on the other side in the axial direction of the end surface of the second protrusion 22*c* on one side in the axial direction.

In this way, the second liquid chamber 32 is provided between the first liquid chamber 31 and the third liquid chamber 33.

The second liquid chamber 32 allows the first liquid chamber 31 and the third liquid chamber 33 to communicate with each other.

A capacity of the second liquid chamber 32 is smaller than a capacity of the first liquid chamber 31 and the third liquid chamber 33. A density of the magnetic powder of the magnetic viscoelastic fluid 3 in the second liquid chamber 32 is greater than a density of the magnetic powder of the magnetic viscoelastic fluid 3 in the first liquid chamber 31 and the third liquid chamber 33.

(Elastic Member)

The elastic member 4 is provided between the tubular member 1 and the shaft member 2, and supports the shaft member 2 to be movable with respect to the tubular member 1. The elastic member 4 includes a first elastic member 41 and a second elastic member 42.

The first elastic member 41 is provided in the first liquid chamber 31. The first elastic member 41 has a first lid section 45 and a first wall section 46.

The first lid section 45 is formed in a disk shape. The first lid section 45 is fixed to the shaft main body 21 on an inner side in the radial direction and fixed to the first magnetic member 13 on an outer side in the radial direction. The first lid section 45 covers the internal space S from one side in the axial direction. That is, one side of the mount bush 5 in the axial direction is covered with the first lid section 45.

The first wall section 46 stands upright from the first lid section 45 toward the other side in the axial direction. As shown in FIG. 2, a plurality of (in the embodiment, four) first wall sections 46 are provided in the circumferential direction. The first wall sections 46 are formed at equal intervals in the circumferential direction. Inner end portions of the first wall sections 46 in the radial direction are fixed to the shaft main body 21, and outer end portions in the radial direction are fixed to the first magnetic member 13. The first wall sections 46 divide the first liquid chamber 31 in the circumferential direction. Further, the number of first wall sections 46 is not limited to four. In addition, the first wall section 46 may not be provided.

The second elastic member 42 is provided in the third liquid chamber 33. The second elastic member 42 has a second lid section 47 and a second wall section 48.

The second lid section 47 is formed in a disk shape. The second lid section 47 is fixed to the shaft main body 21 and the second magnetic member 22 on an inner side in the radial direction and fixed to the outer tube 11 on an outer side in the radial direction. A thickness of the second lid section 47 in the axial direction is greater than a thickness of the first lid section 45 in the axial direction. The second lid section 47 covers the internal space S from the other side in the axial direction. That is, the other side of the mount bush 5 in the axial direction is covered with the second lid section 47.

The second wall section 48 stands upright from the second lid section 47 toward one side in the axial direction. As shown in FIG. 4, a plurality of (in the embodiment, four) second wall sections 48 are provided in the circumferential direction. The second wall sections 48 are formed at equal intervals in the circumferential direction. Inner end portions of the second wall sections 48 in the radial direction are fixed to the second magnetic member 22, and outer end portions in the radial direction are fixed to the outer tube 11. The second wall sections 48 divide the third liquid chamber 33 in the circumferential direction. Further, the number of the second wall sections 48 is not limited to four. In addition, the second wall section 48 may not be provided.

(Actions and Effects)

Next, actions and effects of the mount bush 5 will be described.

When a load is input to the shaft member 2, the shaft member 2 moves with respect to the tubular member 1 and the magnetic viscoelastic fluid 3 passes through the second liquid chamber 32 and moves between the first liquid chamber 31 and the third liquid chamber 33. Here, damping characteristics of the mount bush 5 can be controlled by varying the viscosity of the magnetic viscoelastic fluid 3 in the second liquid chamber 32.

As shown in FIG. 1, in the non-conduction state in which current does not flow through the coil 23, the permanent magnet 24 forms the magnet magnetic path P in an orientation passing through the axial passage 35 in the radial direction and an orientation passing through the shaft-perpendicular passage 36 in the axial direction. Accordingly, in the magnetic viscoelastic fluid 3 with which the axial passage 35 and the shaft-perpendicular passage 36 are filled, movement of the magnetic powder is restricted by the magnetic force of the permanent magnet 24, and a high viscosity of the magnetic viscoelastic fluid 3 is maintained.

Accordingly, even in the non-conduction state in which current does not flow through the coil 23, desired damping characteristics and rigidity can be secured in the mount bush 5.

In addition, since the coil 23 forms the magnetic path along the magnet magnetic path P according to electrical conduction, the viscosity of the magnetic viscoelastic fluid 3 can be decreased in comparison with in the non-conduction state through electrical conduction to the coil 23 so that the magnetic force is generated against a magnetizing direction of the permanent magnet 24. On the contrary, the viscosity of the magnetic viscoelastic fluid 3 can be increased in comparison with the non-conduction state through electrical conduction to the coil 23 so that a magnetic force is generated in the magnetizing direction of the permanent magnet 24. In this way, the viscosity of the magnetic viscoelastic fluid 3 can be varied to a desired magnitude by changing a magnitude and an orientation of the current flowing through the coil 23. Accordingly, a degree of freedom when the damping characteristics are varied can be improved.

In addition, since the magnetic viscoelastic fluid 3 in the second liquid chamber 32 is maintained by the magnetic force of the permanent magnet 24 in the state in which the density of the magnetic powder is high, for example, when the magnetic powder is applied to a part such as the mount bush 5 or the like of an engine having a small stroke and in which it is difficult for the magnetic viscoelastic fluid 3 to be stirred, precipitation of the magnetic powder can be minimized. Accordingly, responsiveness according to a variation in viscosity upon electrical conduction to the coil 23 can be improved.

Accordingly, it is possible to provide the mount bush 5 in which precipitation of the magnetic powder is minimized and a desired viscosity in the non-conduction state is obtained.

In addition, since the second liquid chamber 32 has the axial passage 35 and the shaft-perpendicular passage 36, a fluid resistance easily occurs in the magnetic viscoelastic fluid 3 due to a variation in a flow direction. Accordingly, a high viscosity of the magnetic viscoelastic fluid 3 in the non-conduction state can be maintained. Accordingly, it is possible to provide the mount bush 5 in which a desired viscosity in the non-conduction state is obtained.

According to the mount bush 5 of the embodiment, since the tubular member 1 includes the first magnetic member 13 and the shaft member 2 includes the second magnetic member 22, the magnetic path formed by the permanent magnet 24 and the coil 23 passes through the first magnetic member 13 and the second magnetic member 22 and the magnetic path is formed in the second liquid chamber 32. Accordingly, in the non-conduction state, desired damping characteristics and rigidity can be secured in the mount bush 5. In addition, the viscosity of the magnetic viscoelastic fluid 3 filled into the second liquid chamber 32 according to electrical conduction to the coil 23 can be varied to a desired magnitude.

In addition, since the permanent magnet 24 is formed in a tubular shape, the magnet magnetic path P of the permanent magnet 24 is formed throughout the circumferential direction. Accordingly, a rate of change of the viscosity of the magnetic viscoelastic fluid 3 in the circumferential direction can be uniformized in the circumferential direction.

Since the first liquid chamber 31 has the first elastic member 41 that divides the first liquid chamber 31 in the circumferential direction and the third liquid chamber 33 has the second elastic member 42 that divides the third liquid chamber 33 in the circumferential direction, a flow of the magnetic viscoelastic fluid 3 in the circumferential direction can be suppressed, and the magnetic viscoelastic fluid 3 can reliably flow into the second liquid chamber 32 in which the magnetic path is formed. Accordingly, a magnitude of the viscosity can be reliably controlled.

In addition, since the permanent magnet 24 is provided on the shaft member 2 and the magnetizing direction is directed in the axial direction, the magnet magnetic path P of the permanent magnet 24 can be formed along the magnetic path formed by the coil 23. Accordingly, the viscosity of the magnetic viscoelastic fluid 3 can be increased or decreased according to electrical conduction to the coil 23. In addition, precipitation of the magnetic powder can be suppressed by maintaining the state in which the density of the magnetic powder in the second liquid chamber 32 is high.

Accordingly, it is possible to provide the mount bush 5 in which precipitation of the magnetic powder is suppressed and a desired viscosity in the non-conduction state is obtained.

Next, a first variant to a third variant according to the embodiment will be described with reference to FIG. 5 to FIG. 7. Further, the same or similar members in the above-mentioned embodiment as those in the first variant to the third variant are designated by the same reference numerals, and detailed description thereof will be omitted. In the following description, reference numerals related to the components other than those disclosed in FIG. 5 to FIG. 7 appropriately refer to FIG. 1 to FIG. 4.

(First Variant)

Figure 5:
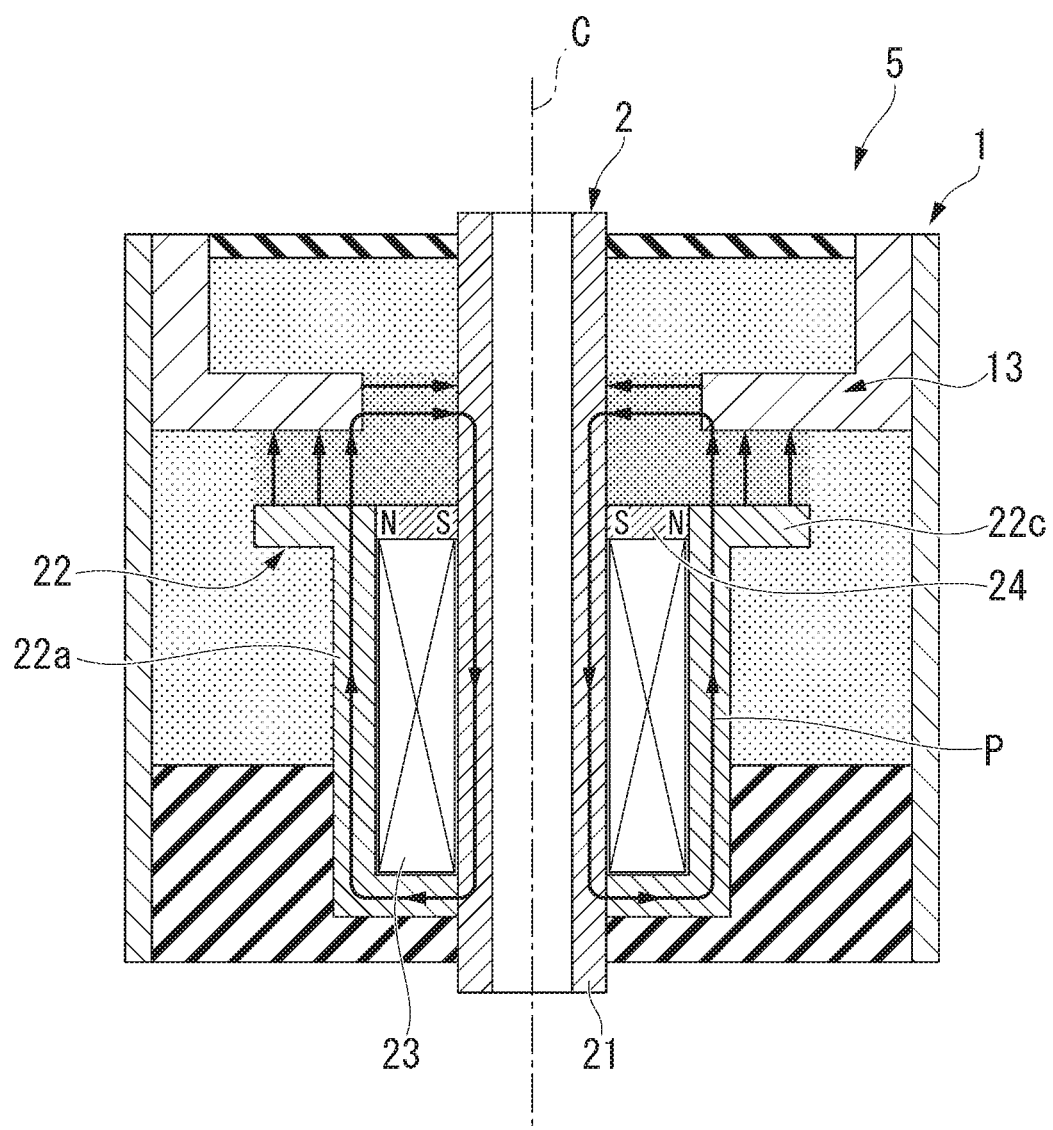
FIG. 5 is a longitudinal cross-sectional view of a mount bush according to a first variant of the first embodiment.

FIG. 5 is a longitudinal cross-sectional view of the mount bush 5 according to the first variant. In the embodiment, a disposition place of the permanent magnet 24 is different from the above-mentioned embodiment.

In the embodiment, the permanent magnet 24 is fixed to the outer circumferential surface of the shaft main body 21 and formed in a ring shape extending in the radial direction. The outer circumferential surface of the permanent magnet 24 comes in contact with the inner circumferential surface of the tubular section 22a of the second magnetic member 22. The end surface of the permanent magnet 24 on the other side in the axial direction comes in contact with the coil 23. The end surface of the permanent magnet 24 on one side in the axial direction is flush with the second protrusion 22c. The permanent magnet 24 is magnetized such that an inner side in the radial direction becomes an S pole and an outer side in the radial direction becomes an N pole.

(Second Variant)

Figure 6:
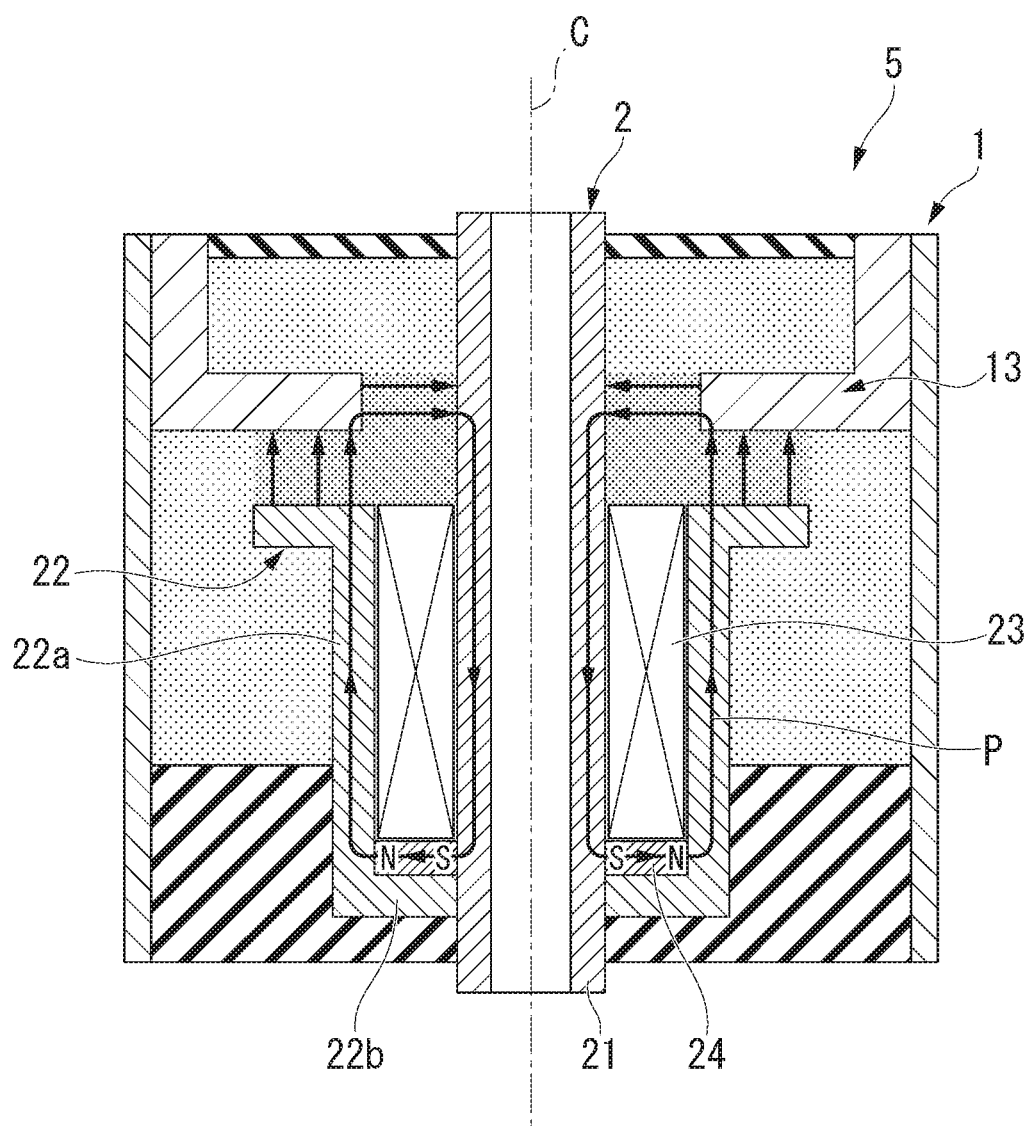
FIG. 6 is a longitudinal cross-sectional view of a mount bush according to a second variant of the first embodiment.

FIG. 6 is a longitudinal cross-sectional view of the mount bush 5 according to the second variant.

In the embodiment, the permanent magnet 24 is fixed to the outer circumferential surface of the shaft main body 21 and formed in a ring shape extending in the radial direction. The outer circumferential surface of the permanent magnet 24 comes in contact with the inner circumferential surface of the tubular section 22a of the second magnetic member 22. The end surface of the permanent magnet 24 on the other side in the axial direction comes in contact with the bottom section 22b. The end surface of the permanent magnet 24 on one side in the axial direction comes in contact with the coil 23. The permanent magnet 24 is magnetized such that an inner side in the radial direction becomes an S pole and an outer side in the radial direction becomes an N pole.

(Third Variant)

Figure 7:
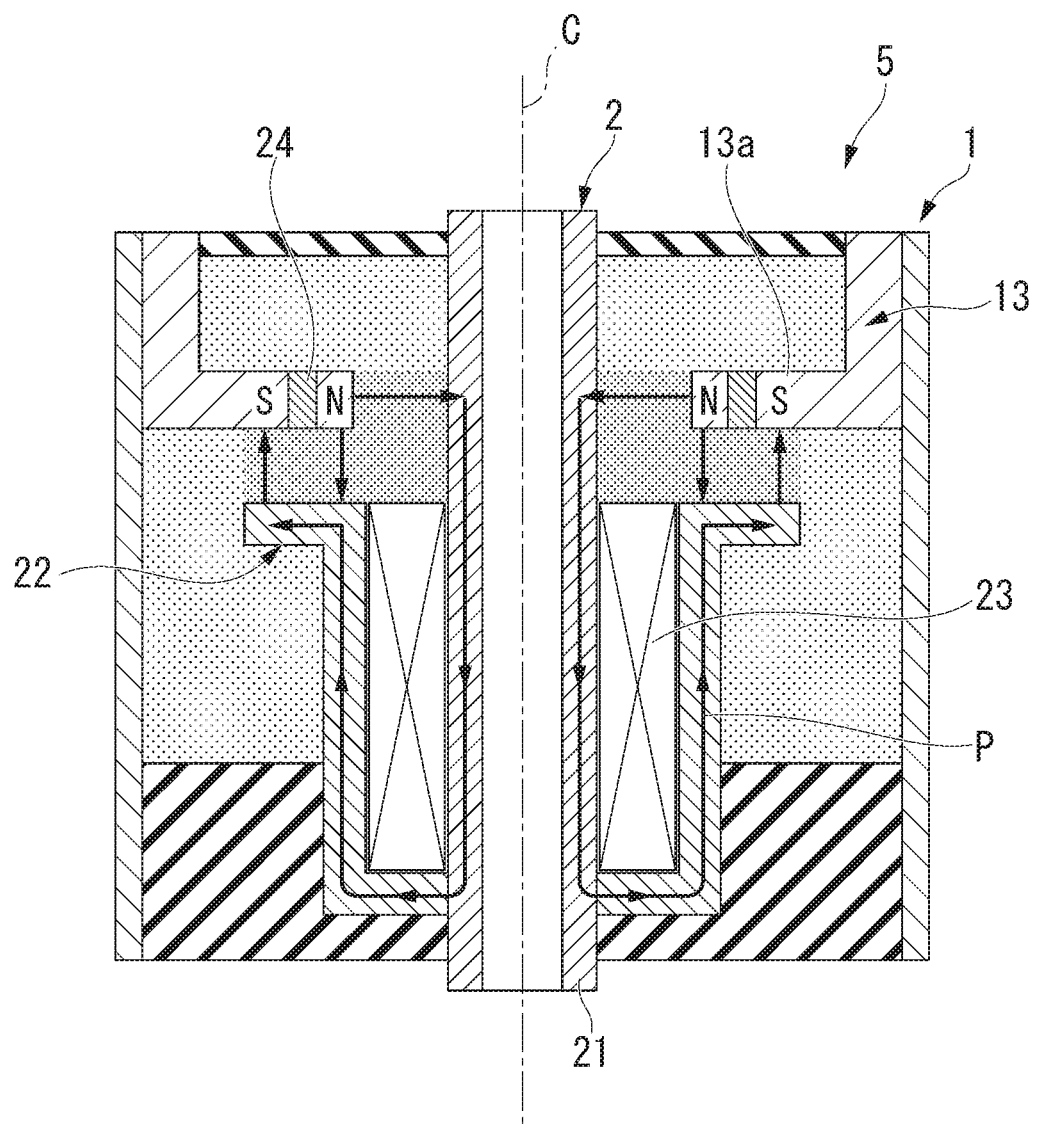
FIG. 7 is a longitudinal cross-sectional view of a mount bush according to a third variant of the first embodiment.

FIG. 7 is a longitudinal cross-sectional view of the mount bush 5 according to the third variant. The embodiment is distinguished from the above-mentioned embodiment in that the permanent magnet 24 is formed integrally with the first magnetic member 13.

In the embodiment, the permanent magnet 24 is provided on the first protrusion 13a of the first magnetic member 13. The permanent magnet 24 is formed in a ring shape inserted into the first protrusion 13a in the radial direction. That is, the permanent magnet 24 is formed integrally with the first protrusion 13a. The permanent magnet 24 is magnetized such that an inner side in the radial direction becomes an N pole and an outer side in the radial direction becomes an S pole.

According to the first variant to the third variant, the same magnet magnetic path P as that of the first embodiment can be formed by providing the permanent magnet 24 on the first magnetic member 13 and the second magnetic member 22. Accordingly, in addition to exhibition of the same actions and effects as those of the first embodiment, a degree of freedom in design related to disposition of the permanent magnet 24 can be improved.

Further, disposition of the permanent magnet 24 is not limited to the above-mentioned variants. The permanent magnet 24 may be provided at a place of any one of the tubular member 1 and the shaft member 2 as long as the magnet magnetic path P along a coil magnetic path generated by the coil 23 can be formed. In addition, the magnetizing direction of the permanent magnet may be inverted.

Next, a second embodiment to a fifth embodiment will be described with reference to FIG. 8 to FIG. 11. Further, the same or similar members in the second embodiment to the fifth embodiment as those in the first embodiment are designated by the same reference numerals, and detailed description thereof will be omitted. In the following description, reference numerals related to the components other than those disclosed in FIG. 8 to FIG. 11 appropriately refer to FIG. 1 to FIG. 4.

(Second Embodiment)

Figure 8:
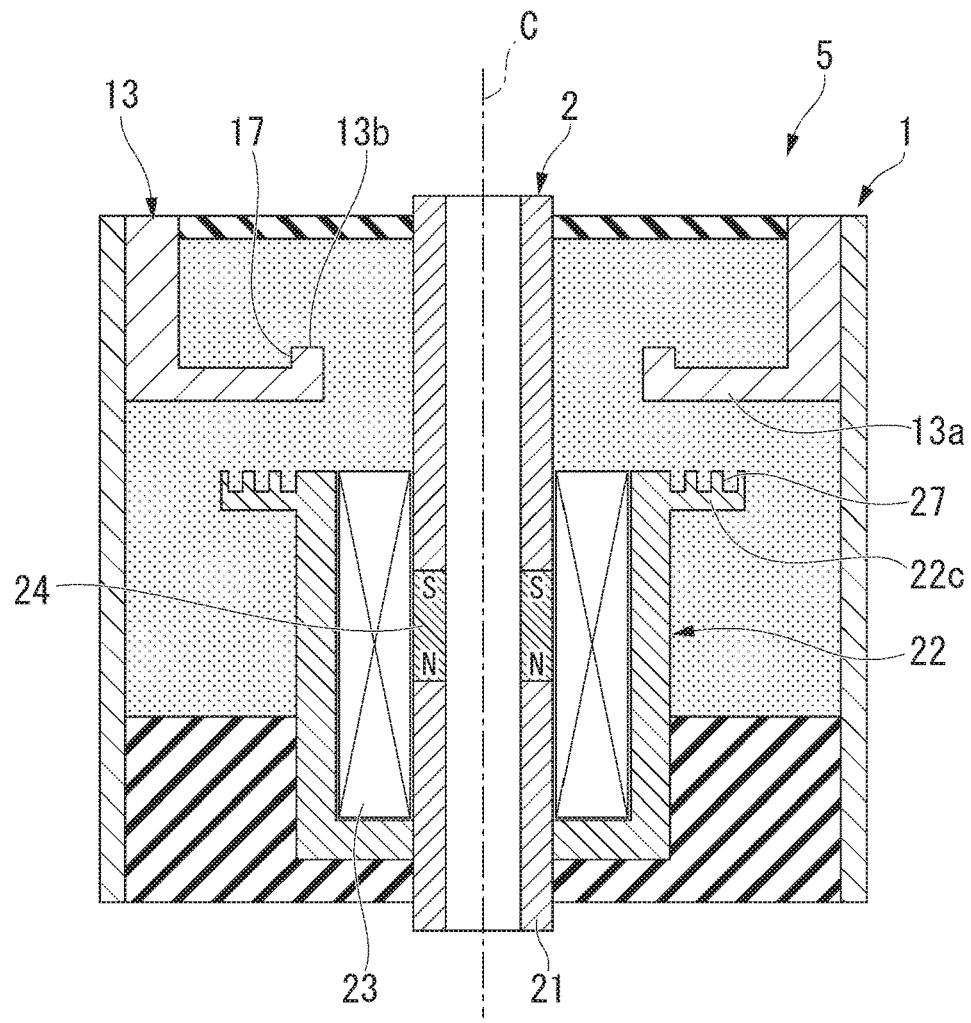
FIG. 8 is a longitudinal cross-sectional view of a mount bush according to a second embodiment.

FIG. 8 is a longitudinal cross-sectional view of the mount bush 5 according to the second embodiment. The embodiment is distinguished from the above-mentioned embodiment in that a first concave section 17 and a second concave section 27 are formed in the first magnetic member 13 and the second magnetic member 22, respectively.

In the embodiment, the first concave section 17 recessed toward the other side in the axial direction is formed in an end surface 13b of the first magnetic member 13 on one side of the first protrusion 13a in the axial direction. The first concave section 17 is formed throughout the circumferential direction. The second concave section 27 recessed toward the other side in the axial direction is formed in the second protrusion 22c of the second magnetic member 22. The second concave section 27 is formed throughout the circumferential direction. A plurality of second concave sections 27 are formed in the radial direction.

According to the embodiment, since the tubular member 1 and the shaft member 2 have the concave sections 17 and 27 formed in wall surfaces of the portion in which the magnetic path is formed, precipitation of the magnetic powder is suppressed by accumulating the magnetic powder on the concave sections 17 and 27. Accordingly, the state in which the density of the magnetic powder of the magnetic viscoelastic fluid 3 in the vicinity of the second liquid chamber 32 is high can be maintained. Accordingly, responsiveness according to a variation in viscosity upon electrical conduction to the coil 23 can be improved.

Accordingly, it is possible to provide the mount bush 5 in which precipitation of the magnetic powder is suppressed.

(Third Embodiment)

Figure 9:
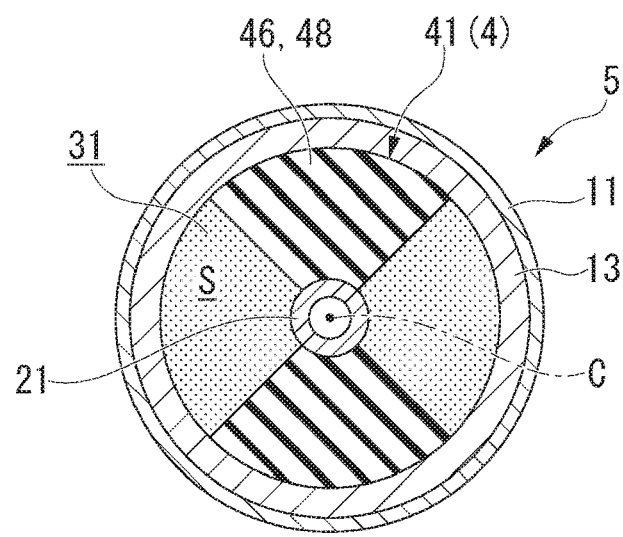
FIG. 9 is a cross-sectional view taken along line II-II in FIG. 1 according to a third embodiment.

FIG. 9 is a cross-sectional view taken along line II-II in FIG. 1 according to a third embodiment. The embodiment is distinguished from the above-mentioned embodiment in that the wall sections 46 and 48 of the elastic member 4 are formed in a fan shape when seen in the axial direction.

In the embodiment, as shown in FIG. 9, the first wall section 46 of the first elastic member 41 is formed in a fan shape when seen in the axial direction. The first wall section 46 has an outer circumferential surface that is connected to the first magnetic member 13 and an inner circumferential surface that is connected to the shaft main body 21. Similarly, the second wall section 48 of the second elastic member 42 is formed in a fan shape when seen in the axial direction. The second wall section 48 has an outer circumferential surface that is connected to the outer tube 11 and an inner circumferential surface that is connected to the shaft main body 21 and the second magnetic member 22.

According to the embodiment, in comparison with the case in which the elastic member 4 having a linear shape is used, high rigidity of the elastic member 4 can be secured. Accordingly, movement of the magnetic viscoelastic fluid 3 in the circumferential direction can be more reliably controlled. Accordingly, a magnitude of the viscosity of the magnetic viscoelastic fluid 3 can be accurately controlled. In addition, the magnetic viscoelastic fluid 3 can also be appropriately used in the mount bush 5 in which high rigidity is required.

(Fourth Embodiment)

Figure 10:
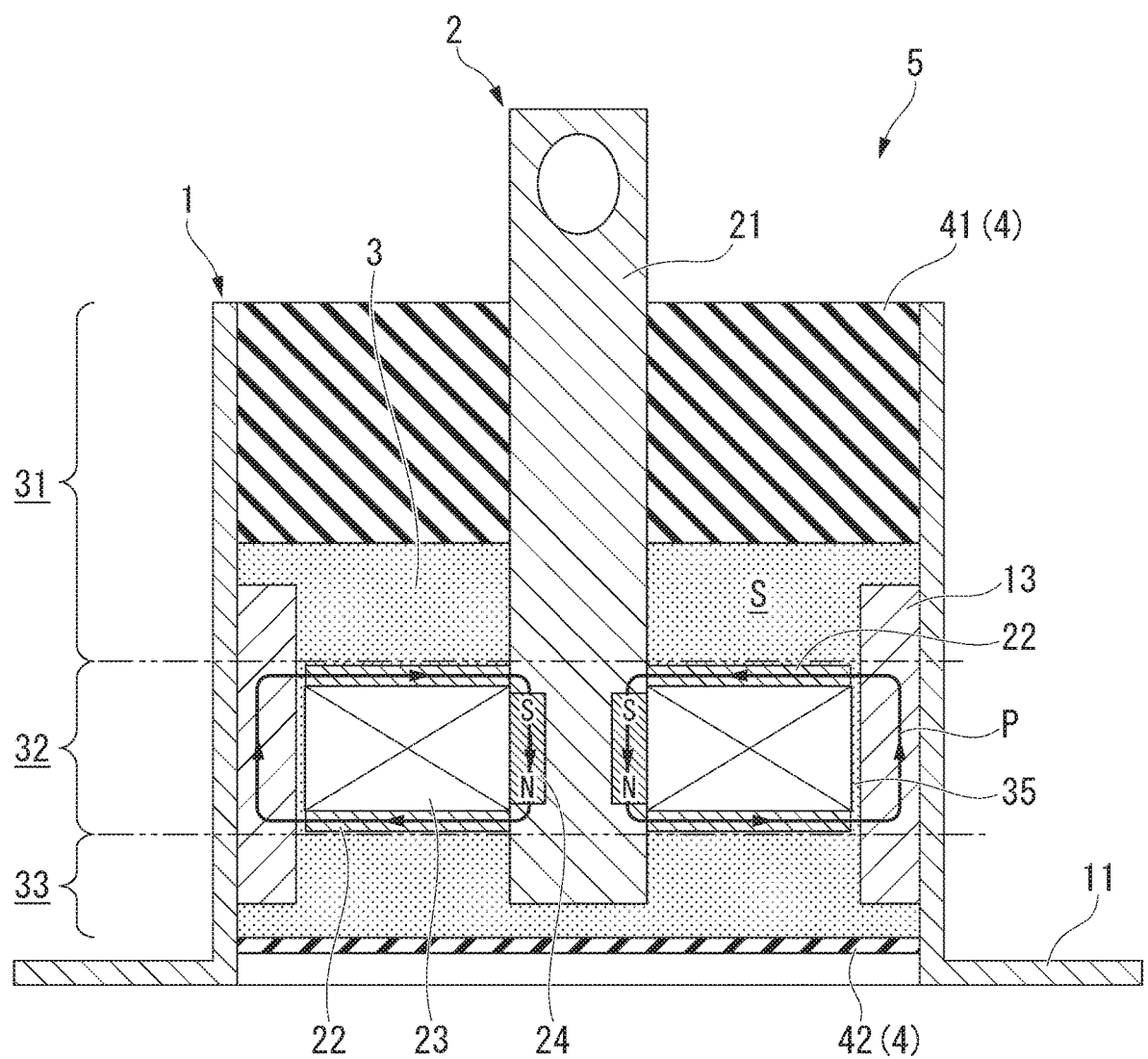
FIG. 10 is a longitudinal cross-sectional view of a mount bush according to a fourth embodiment.

FIG. 10 is a longitudinal cross-sectional view of the mount bush 5 according to a fourth embodiment. The embodiment is distinguished from the above-mentioned embodiment in that the second liquid chamber 32 has only the axial passage 35.

In the embodiment, the shaft member 2 has a shaft main body 21, two second magnetic members 22 formed in a tubular shape and arranged in the axial direction, a coil 23 disposed between the two second magnetic members 22, and a permanent magnet 24 disposed inside the coil 23 in the radial direction. In addition, the first magnetic member 13 is formed in a tubular shape. The magnet magnetic path P of the permanent magnet 24 is formed such that a magnetic flux passes through the shaft main body 21, the second magnetic member 22 on the other side in the axial direction, the first magnetic member 13, the second magnetic member 22 on one side in the axial direction, and the shaft main body 21 in sequence. The axial passage 35 is provided between the outer circumferential surfaces of the second magnetic member 22 and the coil 23 and the inner circumferential surface of the first magnetic member 13. In other words, the second liquid chamber 32 has the axial passage 35.

According to the embodiment, when the shaft member 2 moves with respect to the tubular member 1 in the axial direction, the magnetic viscoelastic fluid 3 passes through the axial passage 35 and moves between the first liquid chamber 31 and the third liquid chamber 33. Here, since a magnetic force in the radial direction is applied to the axial passage 35 by the permanent magnet 24, the viscosity of the magnetic viscoelastic fluid 3 in the axial passage 35 is increased. Accordingly, the desired viscosity in the non-conduction state can be obtained. According to the embodiment, since the second liquid chamber 32 has only the axial passage 35, in addition to exhibition of the same actions and effects as those of the first embodiment, the embodiment can also be applied to the case in which the stroke of the shaft member 2 with respect to the tubular member 1 in the axial direction is large.

(Fifth Embodiment)

Figure 11:
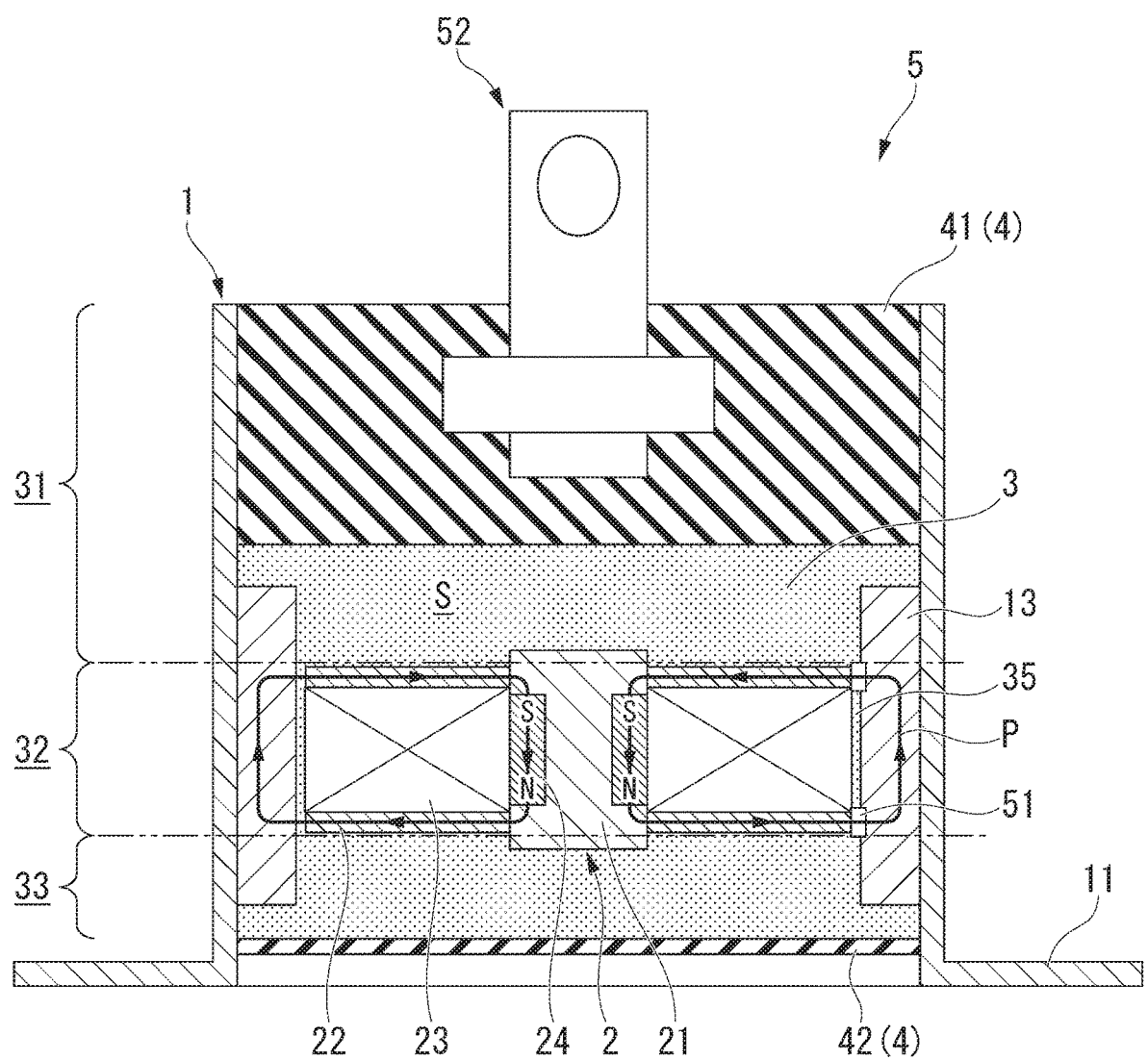
FIG. 11 is a longitudinal cross-sectional view of a mount bush according to a fifth embodiment.

FIG. 11 is a longitudinal cross-sectional view of the mount bush 5 according to a fifth embodiment. The embodiment is distinguished from the above-mentioned embodiment in that the shaft member 2 and the tubular member 1 are joined to each other.

In the embodiment, the first magnetic member 13 and the second magnetic member 22 are joined by a joining member 51. A plurality of (in the embodiment, three) joining members 51 are provided in the circumferential direction. In addition, the first elastic member 41 has a shaft 52. The shaft 52 is configured to be movable with respect to the tubular member 1.

According to the embodiment, when the shaft 52 is displaced and the first elastic member 41 is deformed, the magnetic viscoelastic fluid 3 passes through the axial passage 35 and moves between the first liquid chamber 31 and the third liquid chamber 33. Accordingly, in addition to the same actions and effects as those of the above-mentioned fourth embodiment, versatility can be improved by separately providing the shaft.

Further, the technical scope of the present invention is not limited to the above-mentioned embodiment, and various modifications may be made without departing from the scope of the present invention.

While the tubular member 1 having a tubular shape has been described in the above-mentioned embodiment, an external form of the tubular member 1 when seen in the axial direction may be formed in a rectangular shape or a polygonal shape.

In addition, the permanent magnet 24 may be disposed at a place other than the above-mentioned place as long as the magnet magnetic path P is provided along the magnetic path formed through electrical conduction to the coil 23.

In addition, a plurality of first concave sections 17 and a plurality of second concave sections 27 may be intermittently formed in the circumferential direction.

In the embodiment, while the example in which a load is input to the shaft member 2 has been described, a configuration in which a load is input to the tubular member 1 and the shaft member 2 is fixed to a vehicle body frame may be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A mount bush comprising:
   a tubular member;
   a shaft member that is disposed inside the tubular member coaxially with an axis of the tubular member and that includes a coil;
   a permanent magnet provided on at least one of the tubular member and the shaft member;
   a magnetic viscoelastic fluid filled into an internal space between the tubular member and the shaft member;
   a first liquid chamber disposed in the internal space at a first side in an axial direction which extends along the axis;
   a second liquid chamber communicating with the first liquid chamber at a second side in the axial direction; and
   a third liquid chamber communicating with the second liquid chamber at the second side in the axial direction,
   wherein the coil is disposed such that a magnetic path, which passes through the second liquid chamber in an orientation along at least one of the axial direction and a radial direction perpendicular to the axial direction, is formed through electrical conduction,
   wherein the permanent magnet is disposed such that a magnetizing direction is formed along the magnetic path,
   wherein the second liquid chamber includes:
      an axial passage that communicates with the first liquid chamber and that extends in the axial direction; and
      a shaft-perpendicular passage that communicates with the axial passage and the third liquid chamber and that extends in the radial direction, and
   wherein the coil is disposed such that the magnetic path, which passes through the axial passage in an orientation along the radial direction and passes through the shaft-perpendicular passage in an orientation along the axial direction, is formed through the electrical conduction.

2. The mount bush according to claim 1, wherein the tubular member comprises a first magnetic member,
   the shaft member comprises a second magnetic member, and
   the magnetic path formed by the coil passes through the first magnetic member and the second magnetic member.

3. The mount bush according to claim 1, wherein the permanent magnet is formed in a tubular shape coaxial with the axis.

4. The mount bush according to claim 1, wherein at least one of the first liquid chamber and the third liquid chamber is divided in a circumferential direction by an elastic member.

5. The mount bush according to claim 1, wherein the permanent magnet is provided on the shaft member and the magnetizing direction is directed in the radial direction.

* * * * *